(12) United States Patent
Benet

(10) Patent No.: US 8,931,219 B2
(45) Date of Patent: Jan. 13, 2015

(54) FOUNDATION SYSTEM AND METHOD OF USE FOR DECREASING THE EFFECT OF WIND AND FLOOD DAMAGE

(71) Applicant: Russell E. Benet, Colorado Springs, CO (US)

(72) Inventor: Russell E. Benet, Colorado Springs, CO (US)

( * ) Notice: Subject to any disclaimer, the term of this patent is extended or adjusted under 35 U.S.C. 154(b) by 0 days.

(21) Appl. No.: 13/647,015

(22) Filed: Oct. 8, 2012

(65) Prior Publication Data

US 2014/0096458 A1 Apr. 10, 2014

(51) Int. Cl.
*E02D 5/54* (2006.01)

(52) U.S. Cl.
USPC ............... 52/126.1; 52/745.17; 52/DIG. 11; 248/310; 405/231

(58) Field of Classification Search
USPC ............ 52/122.1, 126.1, 126.5, 126.6, 292, 52/296, 294, 848, 849, DIG. 11; 248/310, 248/313; 256/65.03, 68; 403/190, 199; 405/231, 244, 251, 255
See application file for complete search history.

(56) References Cited

U.S. PATENT DOCUMENTS

| | | | |
|---|---|---|---|
| 835,884 A | 11/1906 | Gray | |
| 2,625,815 A * | 1/1953 | Black | 52/126.1 |
| 3,201,834 A * | 8/1965 | Baittinger | 403/312 |
| 4,754,588 A | 7/1988 | Gregory | |
| 5,661,946 A * | 9/1997 | Davis | 52/849 |
| 5,733,798 A * | 3/1998 | Michael et al. | 716/54 |
| 6,347,489 B1 * | 2/2002 | Marshall et al. | 52/169.9 |
| 6,945,735 B1 * | 9/2005 | Doverspike | 405/184.4 |
| 7,454,871 B2 | 11/2008 | Sproules | |
| 7,563,056 B2 | 7/2009 | Gambill | |
| D689,207 S * | 9/2013 | Benet | D25/133 |
| 2003/0208974 A1 * | 11/2003 | Creed et al. | 52/292 |
| 2008/0304919 A1 | 12/2008 | Coyle | |
| 2011/0131893 A1 * | 6/2011 | Chen | 52/126.6 |

* cited by examiner

*Primary Examiner* — William Gilbert
(74) *Attorney, Agent, or Firm* — Dale J. Ream

(57) ABSTRACT

A foundation system includes a security boot selectively coupled to a pier having a notched upper end. The security boot includes first, second, and third portions complementary to the pier upper end. The security boot third portion includes a configuration complementary to a foundation sill plate and is selectively coupled thereto. The foundation system includes a sleeve configured to be received on a pier, the security boot configured to surround the sleeve and be slidable therealong. The system includes at least one lifting device having a base member and rod configured to engage the sill plate and is movable between a retracted configuration not urging movement of the sill plate and an extended configuration urging the sill plate upwardly. In a method of using the foundation system, the lifting devices may be actuated to lift an entire foundation upwardly from the piers, the security sliding upwardly along an associated sleeve.

21 Claims, 16 Drawing Sheets

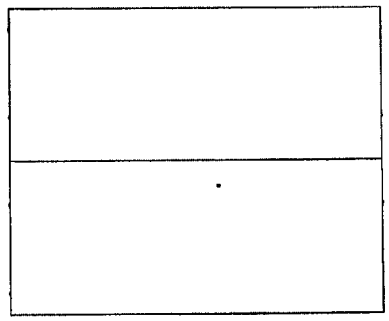
Fig. 10a
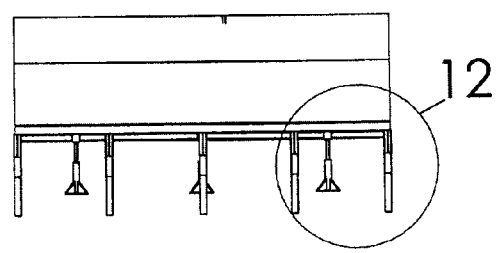 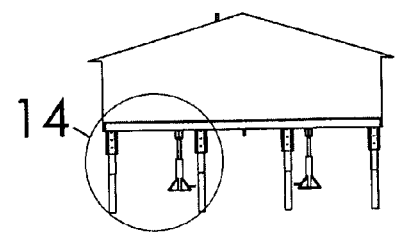
Fig. 10b          Fig. 10c

FOUNDATION SYSTEM AND METHOD OF USE FOR DECREASING THE EFFECT OF WIND AND FLOOD DAMAGE

REFERENCE TO RELATED PATENT APPLICATION

This application is related to U.S. Design patent application Ser. No. 29/414,037, filed Feb. 23, 2012, and titled "Foundation Support," now pending.

BACKGROUND OF THE INVENTION

This invention relates generally to foundation systems and, more particularly, to a foundation strengthening system and method of use for decreasing the catastrophic damage to building foundations caused by wind, floods, and storm surges associated with hurricanes.

Foundations for homes and buildings in coastal regions are often built on a piering system. Long cylindrical piers—sometimes called pilings or posts—are drilled into the ground and extend upwardly. Then large beams are situated horizontally across the piers in a notched area at upper ends of the piers so as to support a home or other building atop the piers. A pier and beam foundation has the advantage of allowing wind and water to pass beneath the house under normal conditions.

Unfortunately, there are severe weather conditions in many coastal regions that may still subject pier foundations to damage or even catastrophic destruction. For instance, hurricanes often strike along coastal areas and bring very high winds, storm surges, and long-term flooding. Strong winds that are not able to pass around or through a house's foundation may cause permanent damage to the house structure. Similarly, a strong storm surge may be higher than the foundation sill plate and cause instant damage to the foundation or, at least, cause flooding in the house.

Specifically, a pier is attached to a connection point of a structure's foundation at its upper "notched end." That is, the upper end of a pier is notched so that the foundation beam or sill plate may rest thereon. It is this notched end that presents the weakest point in attachment between a piling and the foundation. When storm elements, such as wind and storm surge, bear against the pilings and foundation, "notched piling failure" occurs. The connection point of the foundation breaks away from the piling and catastrophic structural collapse occurs.

Therefore, it would be desirable to have a foundation system that having a plurality of security boots that strengthens the connection between one or more piers and the sill plate of a house constructed with a pier beam foundation. Further, it would be desirable to have a foundation system that includes a plurality of lifting device situated beneath a pier foundation that are configured to selectively move the foundation upwardly so as to avoid an incoming ocean surge.

SUMMARY OF THE INVENTION

A foundation system according to the present invention includes a security boot configured to be coupled to a pier having a notched upper end. The security boot may include first, second, and third portions complementary to the configuration of the pier upper end. The security boot third portion includes a configuration complementary to a foundation sill plate and is selectively coupled thereto. The foundation system includes a pier sleeve configured to be received on a pier, the security boot configured to sandwich the pier sleeve and be slidable therealong. The system includes a lifting device having a base member and rod configured to engage the sill plate and movable between a retracted configuration not urging movement of the sill plate and an extended configuration urging the sill plate upwardly. In a method of using the foundation system, the lifting device or devices may be actuated to lift an entire foundation upwardly from the piers, the security sliding upwardly along an associated pier sleeve.

Therefore, a general object of this invention is to provide a foundation system that enhances the strength of the connection between a home's foundation and the pier(s) upon which it is supported.

Another object of this invention is to provide a foundation system, as aforesaid, that includes a plurality of security boots that enhance the strength of the connection between respective piers and the sill plates of a house situated atop the piers.

Still another object of this invention is to provide a foundation system, as aforesaid, that includes a plurality of lifting devices configured to raise the foundation of a house when energized.

Yet another object of this invention is to provide a foundation system, as aforesaid, that includes a plurality of pier sleeves coupled to respective piers of a pier foundation that enable respective security boots to rise with the foundation sill plate(s) as the foundation is raised by the lifting devices.

A further object of this invention is to provide a foundation system, as aforesaid, that includes a method of use for quickly raising a house a predetermined distance so as to avoid catastrophic damage to the foundation as a result of an incoming storm surge.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is a rear view of the foundation system as in FIG. 2a;

FIG. 9b is a side view of the foundation system as in FIG. 9a;

FIG. 10a is a top view of the foundation system as in FIG. 8;

FIG. 10b is a side view of the foundation system as in FIG. 10a;

FIG. 10c is an end view of the foundation system as in FIG. 10b;

DESCRIPTION OF THE PREFERRED EMBODIMENT

A foundation system and a method of use so as to decrease the effects of wind, flood, and storm surge will now be described with reference to FIGS. 1 to 16 of the accompanying drawings. The foundation system 10 includes security boot 20, a pier sleeve 40, and a lifting device 50.

Figure 1:
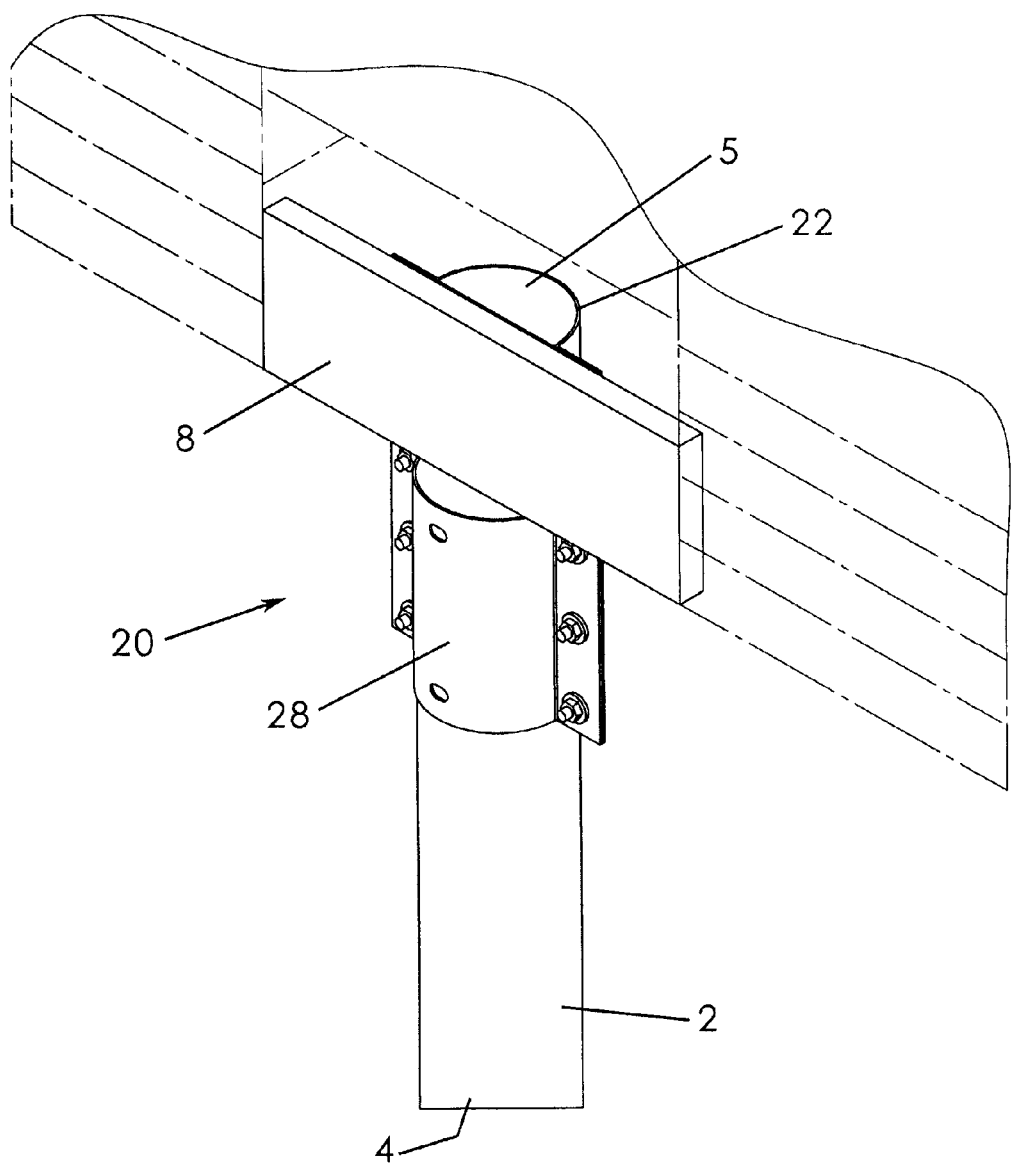
FIG. 1 is a perspective view of a foundation system according to a preferred embodiment of the present invention.
Figure 2A:
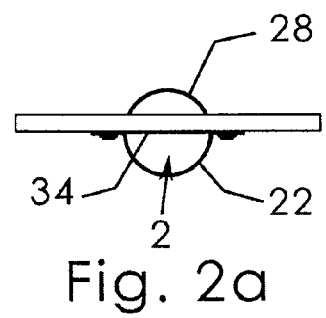
FIG. 2a is a top view of the foundation system as in FIG. 1.
Figure 2B:
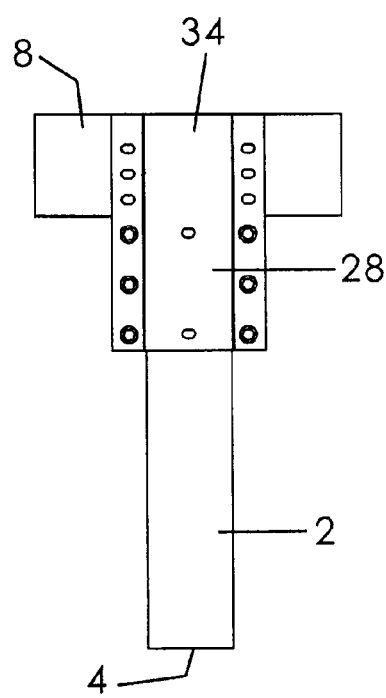
Figure 2C:
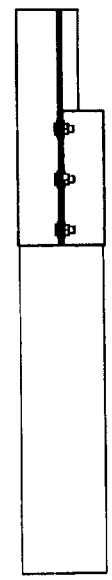
FIG. 2c is a side view of the foundation system as in FIG. 2b.
Figure 3:
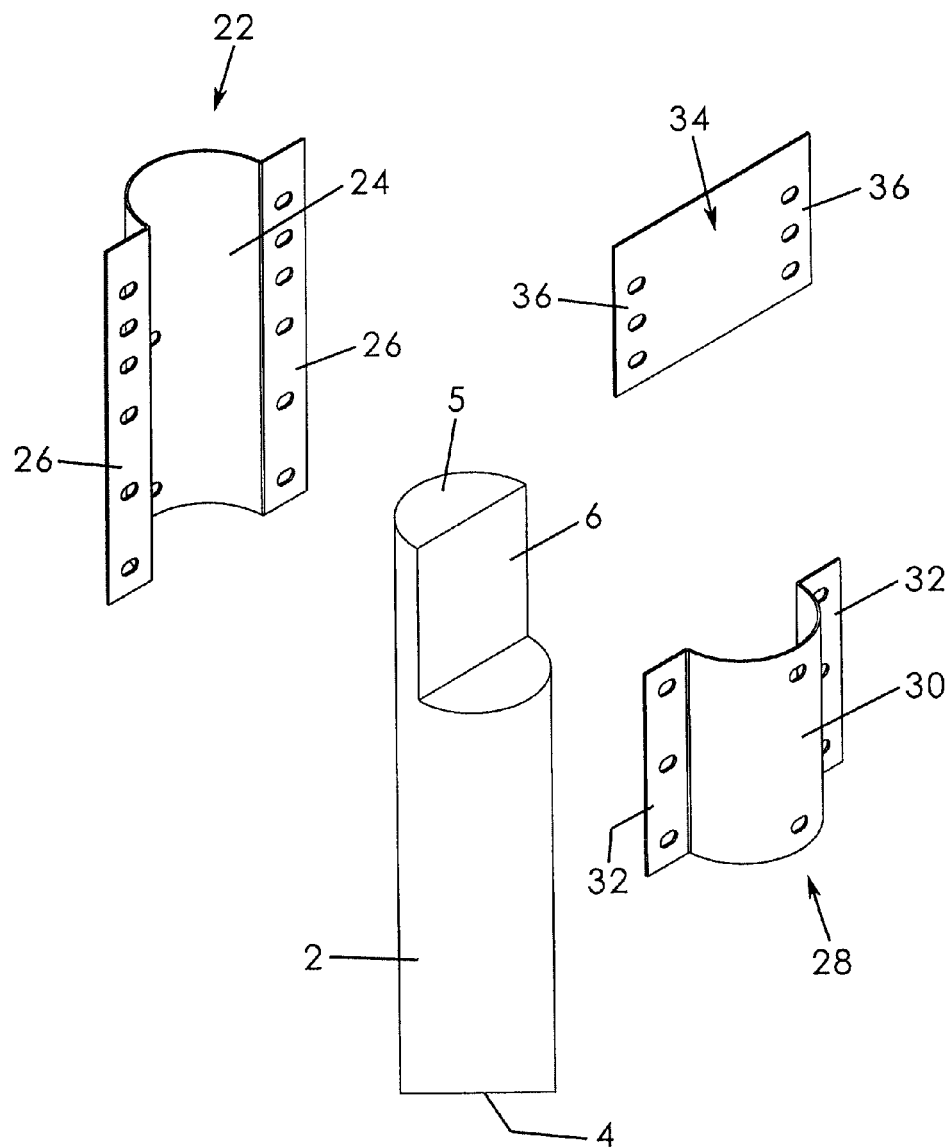
FIG. 3 is an exploded view of the foundation system as in FIG. 1.

The present invention is intended to be used to secure structures that are built on a pier system, such as homes built near the ocean, wetlands, or other area where a traditional foundation is not feasible. Piers 2 used for this type of construction may be generally cylindrical posts that are at a lower end 4 embedded in the ground and at an upper end 5 include a notched area 6 suitable for receiving a sill plate 8 of a building's foundation (FIG. 3 and FIG. 1). A sill plate 8 is typically a horizontally situated board for forming an exterior and base support for the foundation.

The security boot 20 provides a structure that may be received over the upper end 5 of a pier 2. The security boot 20 may include a generally tubular structure that may be slidably positioned along a generally cylindrical pier and secured at a desired location with bolts or other fasteners. More particularly, a security boot 20 may include a first portion 22 having a generally hemispherical configuration that is complementary to a first side of a pier 2. In other words, the first side of a pier 2 may be nested in the hemispherical configuration of the security boot first portion 22. The security boot 20 may also include a second portion 28 having a generally hemispherical configuration that is complementary to a second side of a pier 2. In other words, the second side of a pier 2 may be nested in the hemispherical configuration of the security boot second portion 28.

Figure 4:
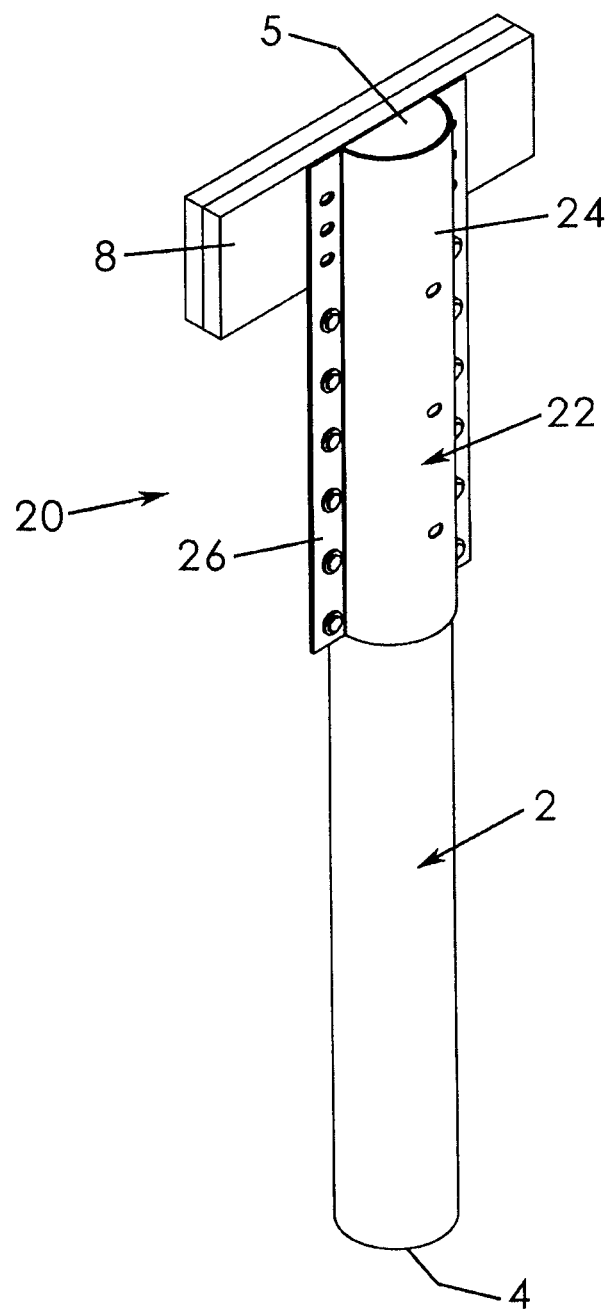
FIG. 4 is a perspective view of the foundation system as in FIG. 1 taken from another angle.

Further, the security boot first portion 22 may include a first portion main section 24 and a pair of opposed first portion attachment sections 26 extending outwardly and away from the first portion main section 24 (FIG. 3). The attachment sections may define a plurality of bolt holes. Similarly, the security boot second portion 28 may include a second portion main section 30 and a pair of opposed second portion attachment sections 32 extending outwardly and away from the second portion main section 30 (FIG. 3). The attachment sections may define a plurality of bolt holes. The security boot first portion 22 may be coupled to the security boot second portion 28 by positioning each portion on the upper end 5 of a pier 2 as described above (FIG. 3) and then fastening/bolting the portions together, such as with bolt/nut combinations or other fasteners (FIG. 4).

The first and second portions of the security boot have slightly different configurations that reflect the configuration of the pier 2. More particularly, the second portion 28 has a height less than a height of the first portion 22 (FIG. 3). Both portions are preferably coupled together about a respective pier 2 at a point below the pier's notched area. The first portion 22, however, extends upwardly on the pier's first side to the pier upper end 5 (FIG. 4) whereas the second portion 28 extends along the pier second side to the notched area 6 (FIG. 1). The respective attachment sections of the first and second portions include the same fastener hole configurations so that the portions may be fastened together to sandwich a pier 2 therebetween.

The security boot 20 includes a third portion 34 having a generally planar configuration that is complementary to the vertical surface of the pier's notched area (FIG. 3). The third portion 34 also includes opposed attachment sections 36 defining fastener holes in the manner described previously. The third portion attachment section 36 is configured to extend wider than the pier notched area vertical wall so that it may be coupled to the security boot first portion with bolt/nut combinations or other fasteners. In one embodiment, the security boot 20 may have a unitary construction or one in which the portions may be slidably received onto a pier 2 and then securely tightened together.

The security boot third portion 34 includes a configuration that is complementary to that of a foundation sill plate 8. Specifically, the third portion 34 has a planar configuration that may be situated against the security boot third portion 34 and coupled thereto, such as with bolts, rivets, screws, or the like (FIGS. 1 and 4). It is clear that with the sill plate 8 of a building's foundation coupled to the entire security boot that strengthen the pier 2, the strength of the entire building is strengthened against wind, earthquake, or other natural disasters.

When the security boot 20 is coupled to the upper end 5 of a pier 2, the pier is sandwiched therebetween and significantly strengthened; specifically, he security boot 20 increases the strength that is naturally lost by the removal of the notched area. Preferably, the security boot 20 is constructed of steel or other strong metal material or alloy.

Figure 6:
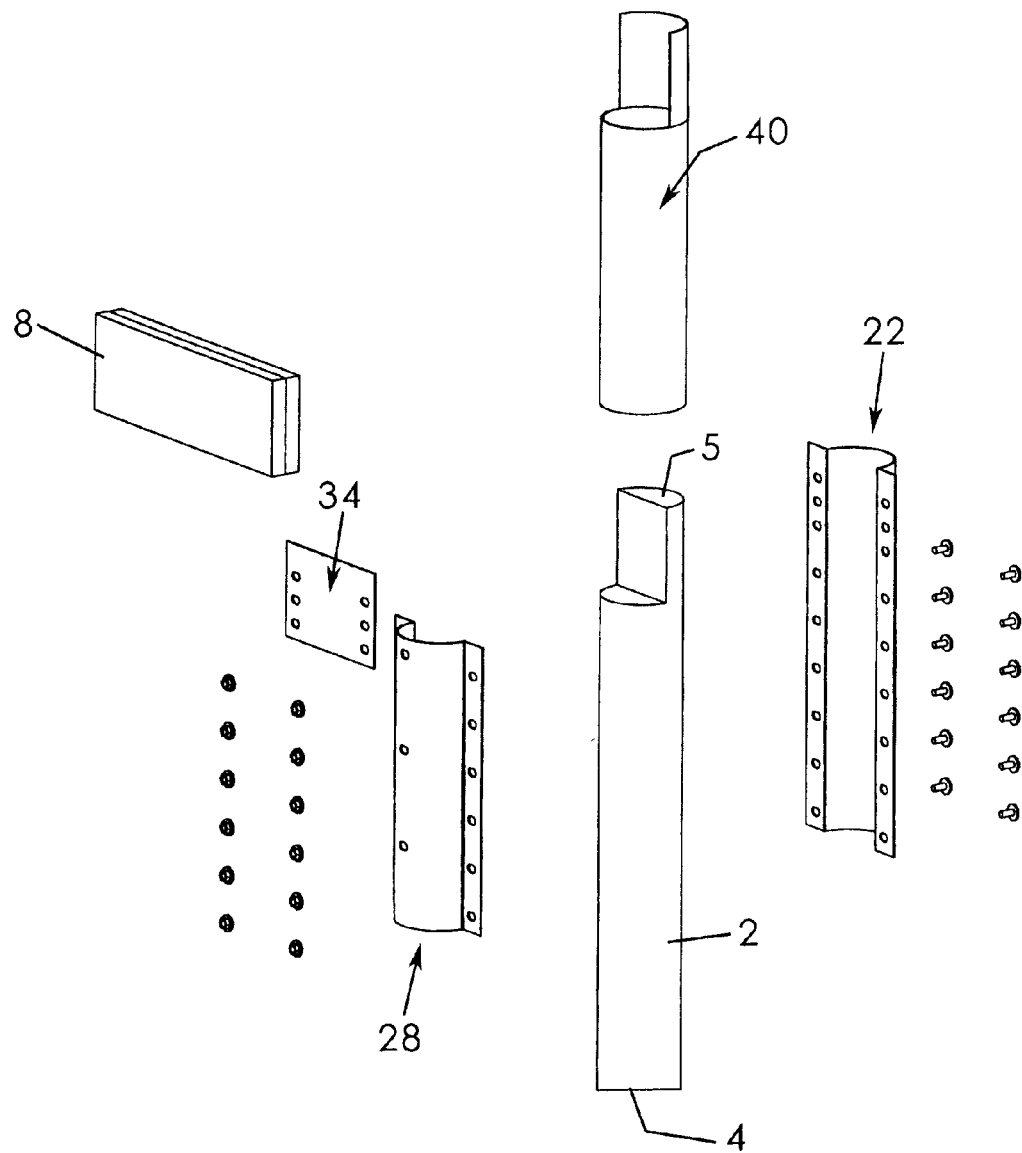
FIG. 6 is an exploded view of the foundation system as in FIG. 5.
Figure 7:
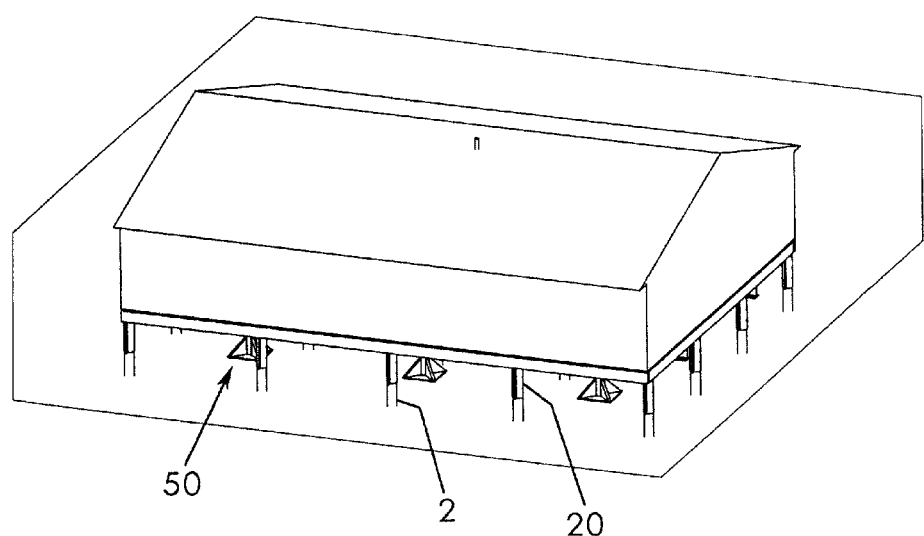
FIG. 7 is a perspective view of the foundation system as in FIG. 5 in use with a pier system building structure and illustrated with the lifting devices in a retracted configuration.

In another aspect of the invention, the foundation system 10 may include a pier sleeve 40. In fact, the foundation system 10 may include a plurality of pier sleeves 40 so that one sleeve 40 may be utilized with each pier 2 that supports a building structure. In this regard, the foundation system 10 may include a plurality of security boots 20 with each security boot 20 having the structure described previously. Each pier sleeve 40 may include a configuration that is complementary to that of a pier 2. More particularly, a pier sleeve 40 may include a generally cylindrical configuration having an inner diameter that is slightly larger than an outer diameter of a pier 2 such that the pier sleeve 40 may be slidably received on a pier 2 (FIG. 6). It is understood that the sleeve 40 may be fastened to the pier 2 such as in a friction fit relationship or with fasteners such as bolts, screws, rivets, or the like.

Figure 5:
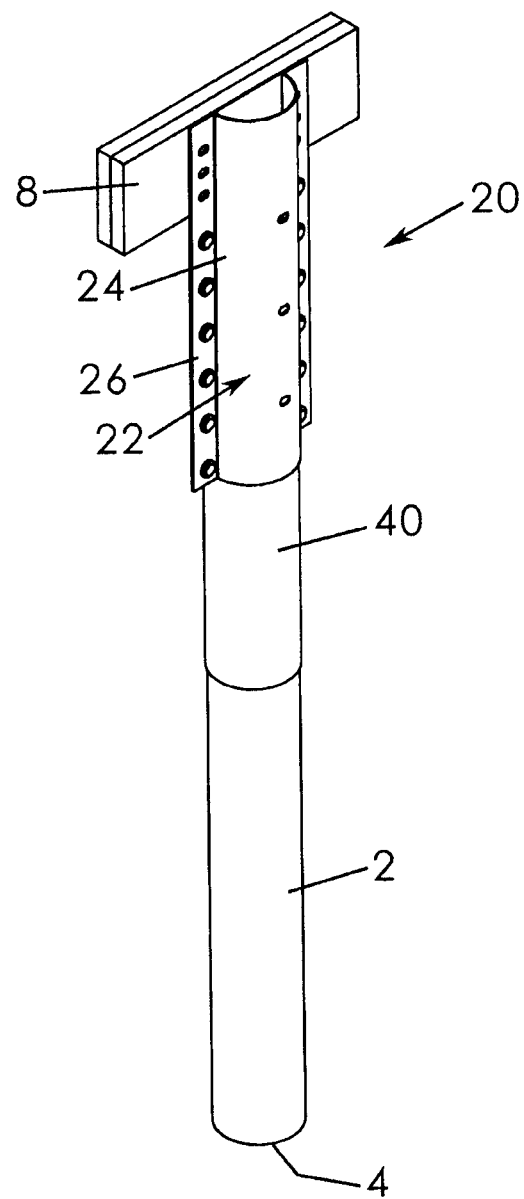
FIG. 5 is a perspective view of a foundation system according to a another embodiment of the present invention.

A security boot 20 may be coupled about a pier sleeve 40 after the pier sleeve 40 has been positioned on a pier 2 as described above. The security boot 20 may be secured by fastening the respective attachment sections together. Importantly, however, the security boot 20 is not coupled directly to the pier sleeve 40; rather, the security boot 20 may be slidably moved along the sleeve 40 as will be described in greater detail later (FIG. 5). The security boot third portion 34 is preferably coupled to a sill plate 8 of a building's foundation.

Figure 8:
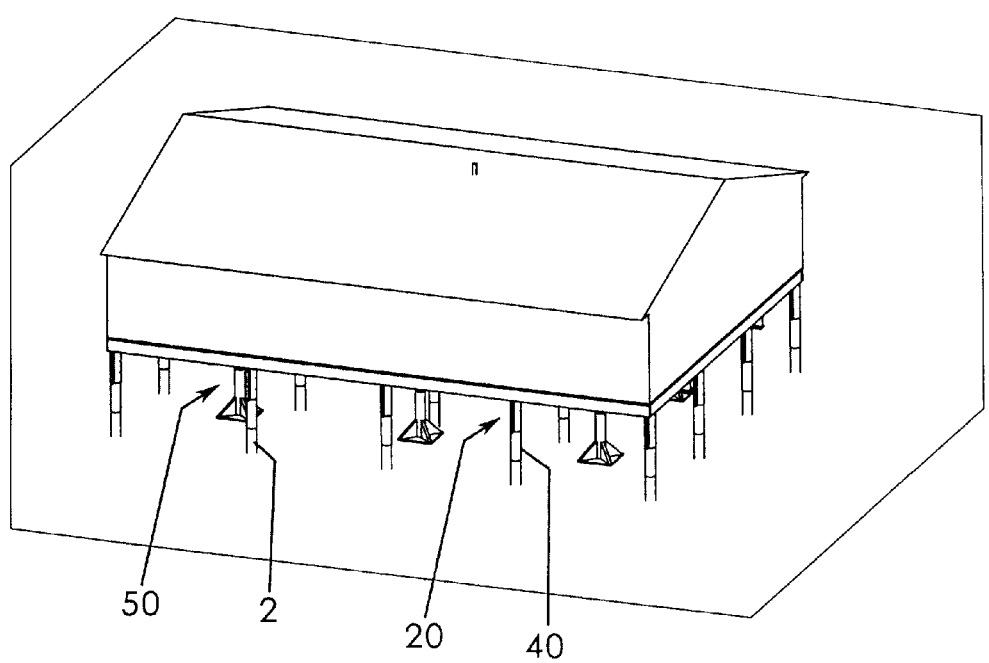
FIG. 8 is another perspective view of the foundation system as in FIG. 7 with the lifting devices in an extended configuration.
Figure 9A:
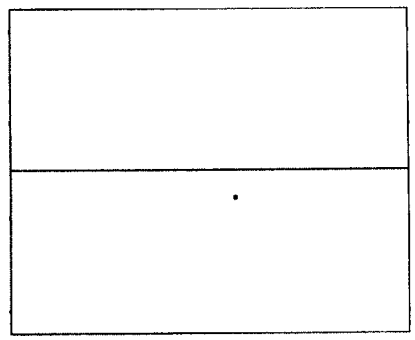
FIG. 9a is a top view of the foundation system as in FIG. 7.
Figure 9B:
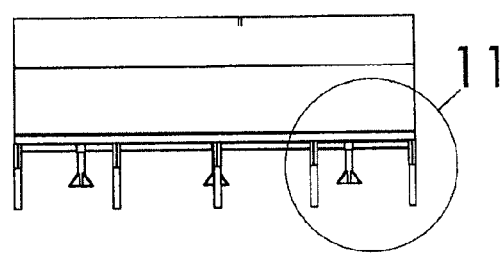
Figure 9C:
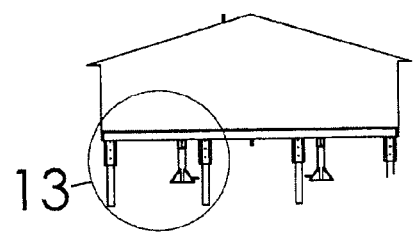
FIG. 9c is an end view of the foundation system as in FIG. 9b.
Figure 11:
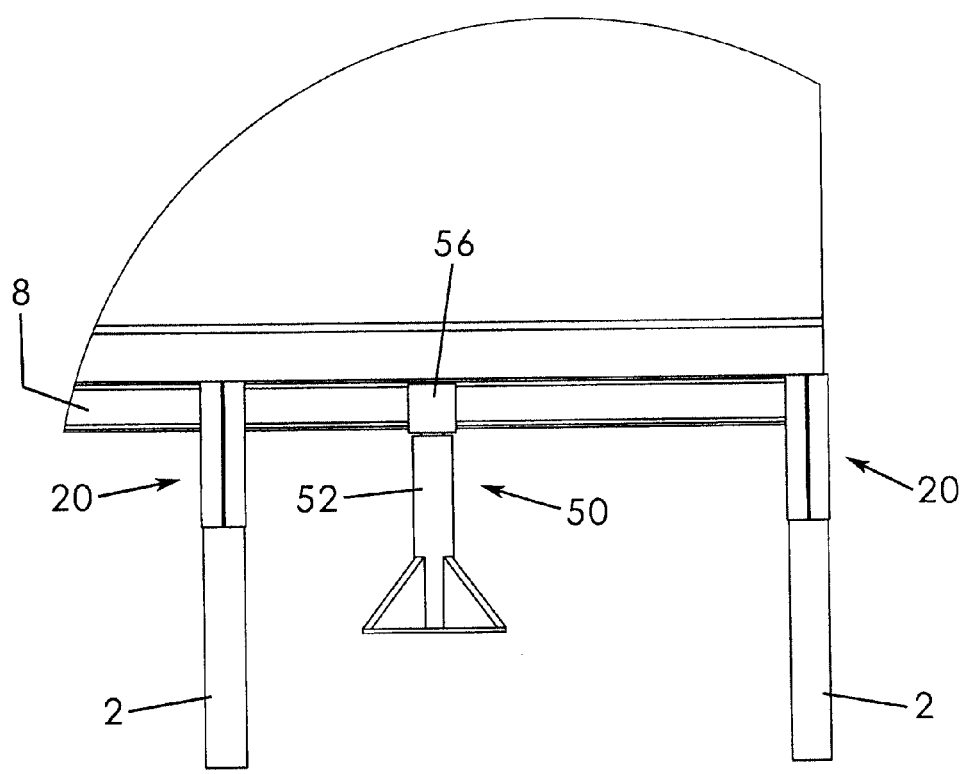
FIG. 11 is an isolated view on an enlarged scale taken from FIG. 9b.
Figure 12:
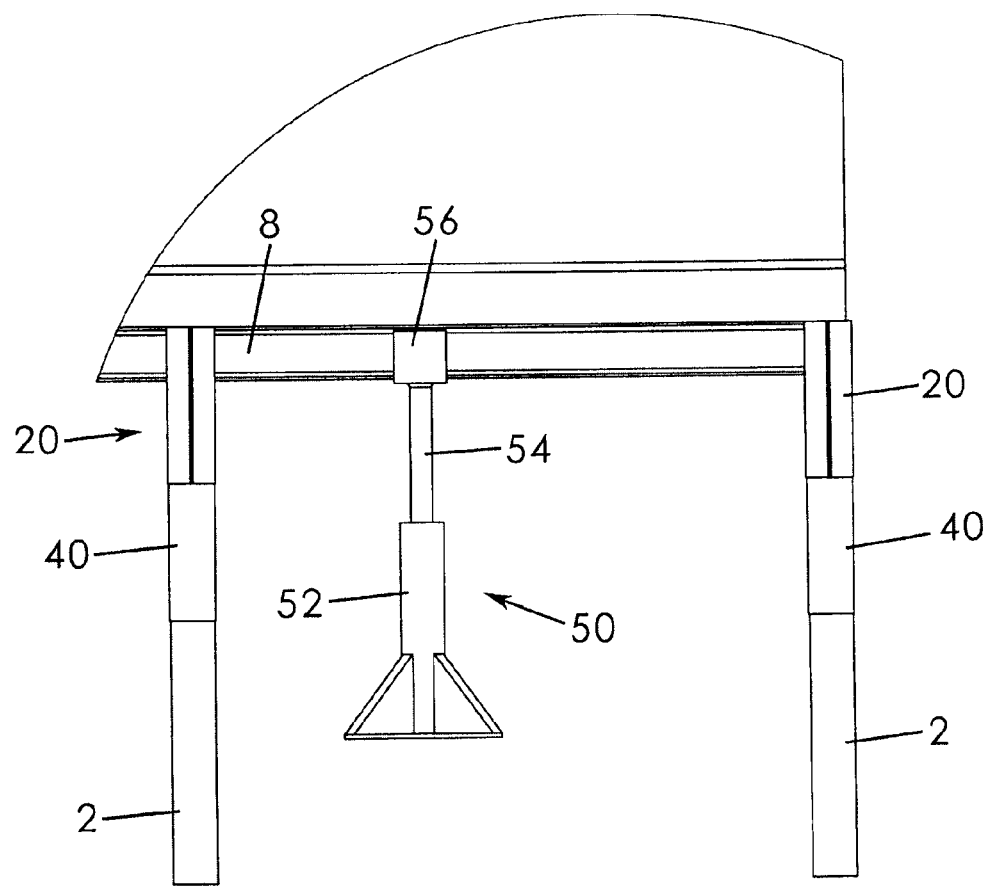
FIG. 12 is an isolated view on an enlarged scale taken from 10b.
Figure 13:
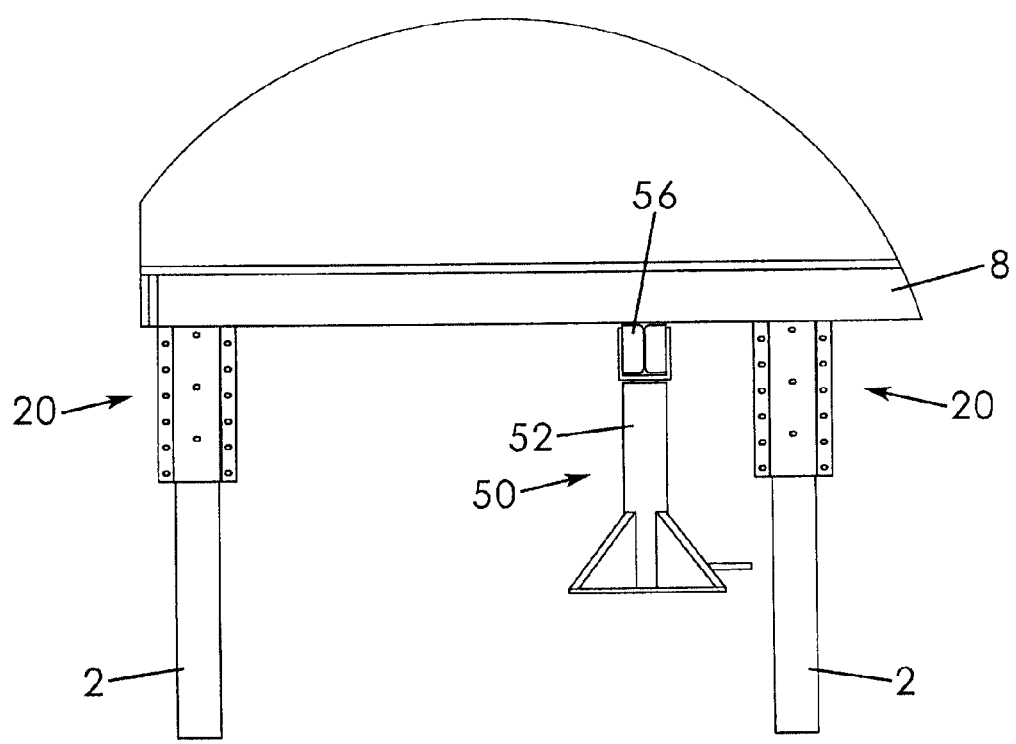
FIG. 13 is an isolated view on an enlarged scale taken from FIG. 9c.
Figure 14:
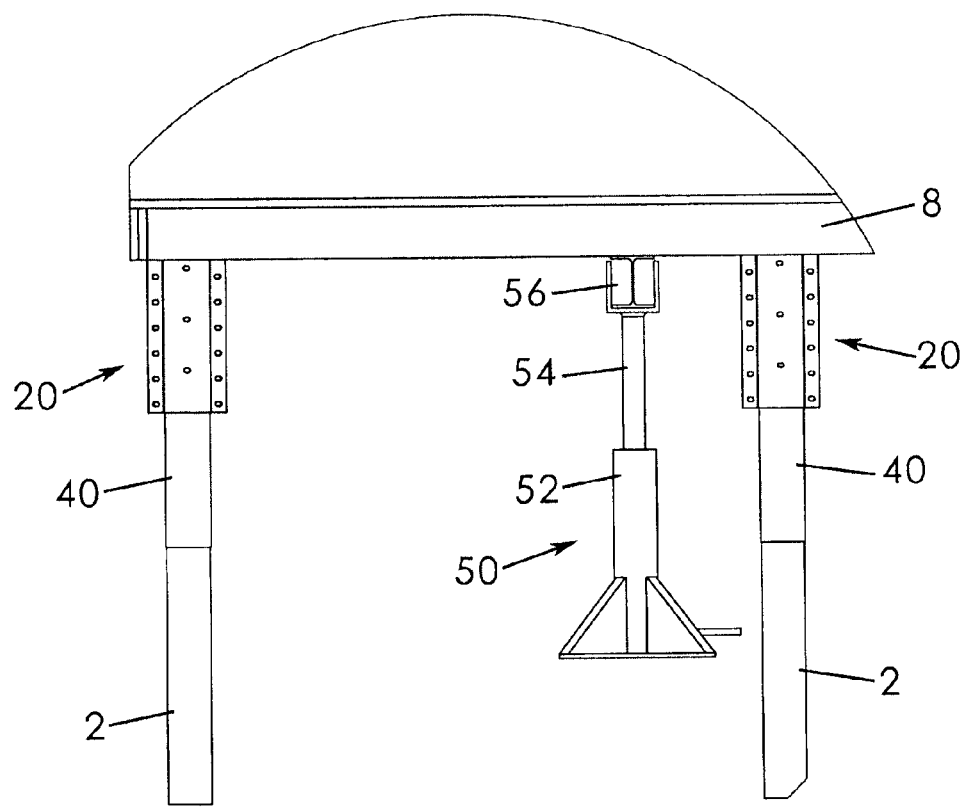
FIG. 14 is an isolated view on an enlarged scale taken from FIG. 10c.

The foundation system 10 may further include at least one lifting device 50. In some embodiments, a plurality of lifting devices 50 may be included (FIG. 8). Each lifting device 50 may include a base member 52 configured to be positioned on a ground surface so as to support the rest of the device and to support a proportionate weight of the building. The lifting device 50 further includes a rod member 54 operatively coupled to the base member 52 and selectively movable between a retracted configuration and an extended configuration. Further, the lifting device 50 may include an engagement member 56 coupled to a distal end of the rod member 54 configured to engage the sill plate 8. In operation, the rod member 54 is movable from the retracted configuration where no upward pressure is exerted upon the sill plate 8 to the extended configuration which urges the sill plate 8 to move upwardly. The rod member 54 is movable when the lifting device 50 is actuated.

Figure 15:
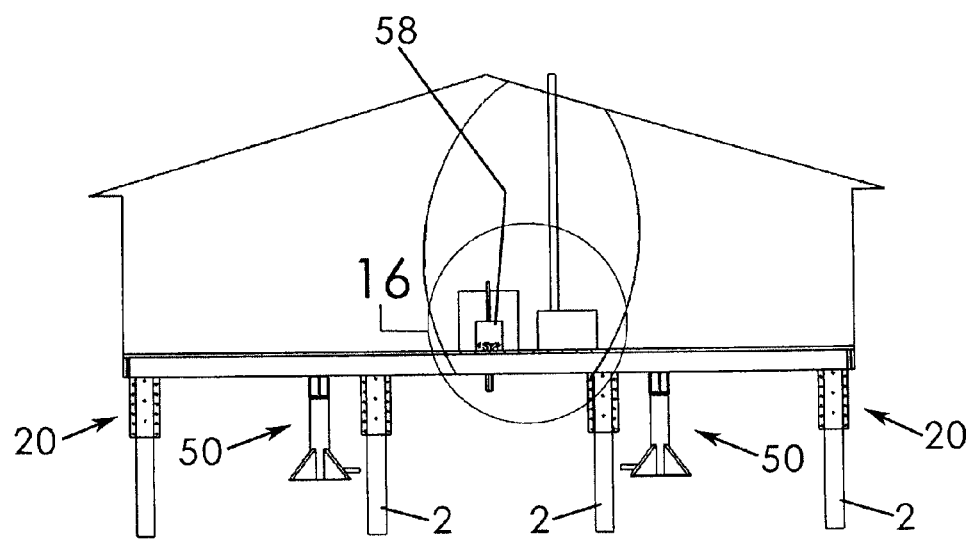
FIG. 15 is an end view of the foundation system as in FIG. 10c.
Figure 16:
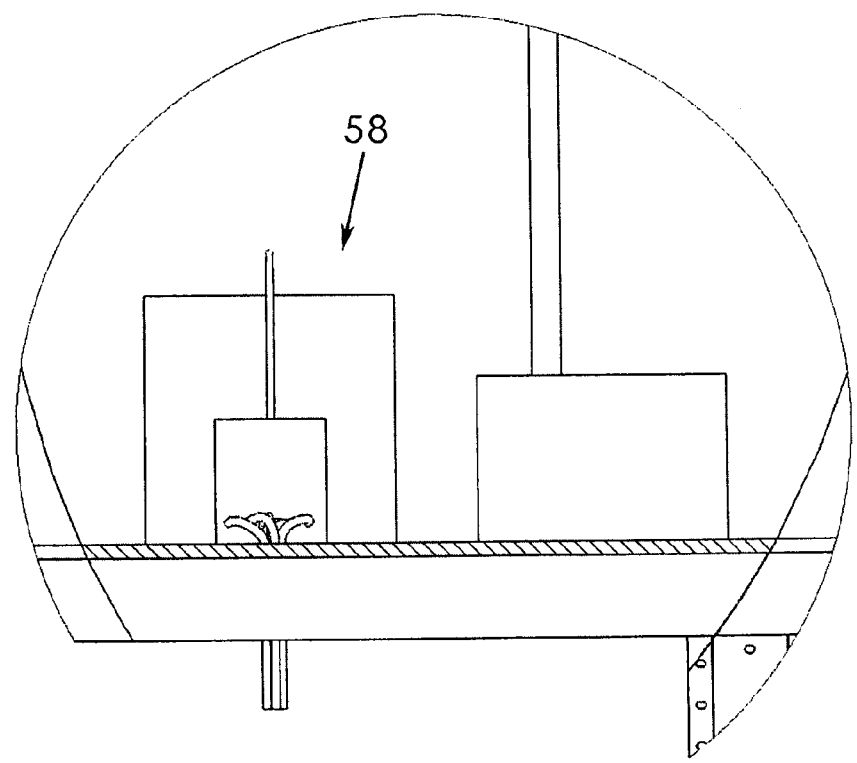
FIG. 16 is an isolated view on an enlarged scale taken from FIG. 15.

The lifting device 50 may be a hydraulic jack that is actuated by hydraulic fluid pressure to move the rod member 54 toward the extended configuration. Alternatively, the lifting device 50 may be a pneumatic jack that is actuated by air pressure to move the rod member 54 toward the extended configuration. In another embodiment, the lifting device 50 may be an electric jack that is actuated by electric current to move the rod member 54 toward the extended configuration. It is understood that the rod member 54 may be actuated by a motor 58 situated remotely from the lifting device 50 and connected to a power supply (FIGS. 15 and 16). In one embodiment, the motor 58 may be situated inside the home or commercial structure.

The present invention includes a method of protecting a building's foundation from the catastrophic effects of a hurricane, storm surge, flooding, and the like using the foundation system 10 described above. First, a plurality of security boots 20 are mounted to a plurality of piers 2 supporting a building as described above, including coupling the security boots 20 to the sill plates 8 of the buildings foundation. Next, a plurality of lifting devices 50 are positioned adjacent the piers 2 and in communication with the sill plate 8. The lifting devices 50 may be selectively actuated to simultaneous exert upward pressure to the sill plates 8. It is understood that each security boot 20 will be moved upwardly relative to the pier 2 as the sill plate 8 and entire building is raised.

Depending on the degree to which the house is to be raised, the method of use may include providing a plurality of pier sleeves 40 and mounting them to each pier 2 as described previously. With the pier sleeves 40 appropriately positioned, the security boots 20 may be slidably moved upwardly therealong as the lifting devices 50 simultaneously cause the sill plate 8 to be raised.

Accordingly, the foundation system 10 enhances the strength of the connection between a home's foundation and the pier 2 upon which it is supported. In addition, the method of using the foundation system 10 enables a home to be raised upwardly so that wind, storm surge, and other effects of a hurricane may not catastrophically destroy the home.

It is understood that while certain forms of this invention have been illustrated and described, it is not limited thereto except insofar as such limitations are included in the following claims and allowable functional equivalents thereof.

The invention claimed is:

1. A foundation system for use with a plurality of piers each pier including an upper end having a notched area configured to receive a foundation sill plate, a first side opposite the notched area, and a second side below the notched area, said foundation system comprising:
a security boot that includes:
a first portion having a generally semi-cylindrical configuration complementary to the first side of a respective pier;
a second portion having a generally semi-cylindrical configuration complementary to the second side of said respective pier;
a third portion having a configuration complementary to the notched area of said respective pier;
wherein said security boot first portion is releasably coupled to said security boot second portion, whereby to sandwich said respective pier between said first portion section and said second portion section; and
wherein said security boot third portion includes a planar configuration that is selectively coupled to an upper section of said security boot first portion.

2. The foundation system as in claim 1, wherein:
said security boot first portion includes a first portion main section and a pair of opposed first portion attachment sections extending away from said first portion main section;
said security boot second portion includes a second portion main section and a pair of opposed second portion attachment sections extending away from said second portion main section; and
said first portion attachment sections are selectively coupled to said second portion attachment sections, whereby to sandwich said respective pier between said first portion main section and said second portion main section.

3. The foundation system as in claim 1, wherein said security boot second portion has a height less than a height of said first portion.

4. The foundation system as in claim 1, wherein said security boot third portion includes a configuration complementary to the foundation sill plate and is configured to be selectively coupled to the sill plate when the sill plate is positioned in the pier notched area.

5. The foundation system as in claim 1, further comprising:
a pier sleeve having a configuration complementary to said respective pier, said pier sleeve having an inner diameter slightly larger than an exterior diameter of the respective pier so as to be slidably positioned over the respective pier; and
said security boot first portion and said security boot second portion sandwich said pier sleeve therebetween when said security boot first portion and said security boot second portion are coupled together.

6. The foundation system as in claim 5, wherein said security boot third portion includes a configuration complementary to the foundation sill plate and is configured to be selectively coupled to the sill plate when the sill plate is positioned in the pier notch area.

7. The foundation system as in claim 6, further comprising:
a lifting device including:
a base member configured to be supported on a ground surface;
a rod member operatively coupled to said base member and slidably movable between a retracted configuration substantially inside said base member and an extended configuration substantially outside said base member;
an engagement member coupled to a distal end of said rod member, said engagement member being configured to engage the sill plate;
wherein movement of said rod causes said engagement member to urge the sill plate upwardly.

8. The foundation system as in claim 7, wherein said security boot is slidably moved upwardly relative to said pier sleeve associated with said security boot when said rod member is moved to said extended configuration.

9. The foundation system as in claim 7, wherein said lifting device is a pneumatic jack that is actuated by air pressure to move said rod between said retracted and extended configurations.

10. The foundation system as in claim 7, wherein said lifting device is a hydraulic jack that is actuated by hydraulic fluid pressure to move said rod between said retracted and extended configurations.

11. The foundation system as in claim 7, wherein said lifting device is an electric jack that is actuated by electric current to move said rod between said retracted and extended configurations.

12. The foundation system as in claim 7, further comprising a motor operatively connected to said lifting device, said motor being electrically connected to an electrical power supply and configured to actuate said lifting device when energized.

13. The foundation system as in claim 7, wherein:
    said pier sleeve includes a plurality of pier sleeves configured to be selectively received on respective piers of a foundation; and
    said lifting device includes a plurality of lifting devices associated with said plurality of pier sleeves, each lifting device configured to be operatively coupled to the sill plate adjacent an associated pier sleeve.

14. A method for protecting a foundation from the effects of wind and floodwaters, the foundation being of a type having a plurality of piers, each pier including an upper end having a notched area configured to receive a foundation sill plate, each said pier having a first side opposite the notched area, and a second side below the notched area, said method comprising the steps:
    providing a plurality of security boots, each security boot configured to surround an upper end of a respective one of the plurality of piers;
    wherein each said security boot includes:
        a first portion having a generally semi-cylindrical configuration complementary to the first side of a respective pier;
        a second portion having a generally semi-cylindrical configuration complementary to the second side of said respective pier;
        a third portion having a generally planar configuration complementary to the notched area of said respective pier; and
    wherein said security boot first portion is releasably coupled to said security boot second portion so as to sandwich said respective pier between said first portion section and said second portion section;
    wherein said security boot first portion is releasably coupled to said security boot second portion, whereby to sandwich said respective pier between said first portion section and said second portion section; and
    wherein said security boot third portion includes a planar configuration that is selectively coupled to and upper section of said security boot first portion.

15. The method as in claim 14, comprising:
    providing a plurality of lifting devices, each lifting devices including a rod ,member configured to be operatively coupled to the sill plate and configured to move between a retracted configuration that does not bear upwardly against the sill plate and an extended configuration that urges the sill plate upwardly;
    selectively actuating said plurality of lifting devices to actuate associated rod members to move simultaneously toward said extended configurations, respectively, so as to raise the sill plate upwardly with respect to respective piers; and
    wherein each security boot is moved upwardly along each pier, respectively, when the sill plate is urged upwardly by said lifting devices, respectively.

16. The method as in claim 15, wherein said security boot third portion includes a configuration complementary to the foundation sill plate.

17. The method as in claim 15, wherein:
    said security boot first portion includes a first portion main section and a pair of opposed first portion attachment sections extending away from said first portion main section;
    said security boot second portion includes a second portion main section and a pair of opposed second portion attachment sections extending away from said second portion main section; and
    said first portion attachment sections are selectively coupled to said second portion attachment sections so as to sandwich a respective pier between said first portion main section and said second portion main section.

18. The method as in claim 15, further comprising:
    providing a plurality of pier sleeves, each pier sleeve having a configuration complementary to a respective pier, said each pier sleeve having an inner diameter slightly larger than an exterior diameter of the respective pier so as to be slidably positioned over the respective pier; and
    wherein a respective security boot first portion and a respective security boot second portion sandwich a respective pier sleeve therebetween when said respective security boot first and second portions are coupled together about said respective pier.

19. The method as in claim 15, wherein each lifting device includes:
    a base member configured to be supported on a ground surface;
    an engagement member coupled to a distal end of said respective rod member, said engagement member being configured to engage the sill plate;
    wherein movement of said rod causes said engagement member to urge the sill plate upwardly.

20. The method as in claim 15, further comprising a motor operatively connected to said plurality of lifting devices, said motor being electrically connected to an electrical power supply and configured to actuate said lifting device when energized.

21. The method as in claim 15, wherein said plurality of lifting devices are taken from the group including a pneumatic jack, a hydraulic jack, and an electric jack.

* * * * *